United States Patent [19]

Herrmann

[11] Patent Number: 5,041,768
[45] Date of Patent: Aug. 20, 1991

[54] POLYPHASE MOTOR CONTROL SYSTEM

[75] Inventor: John E. Herrmann, Mundelein, Ill.

[73] Assignee: Motorola, Inc., Schaumburg, Ill.

[21] Appl. No.: 336,474

[22] Filed: Apr. 12, 1989

[51] Int. Cl.$^5$ .................. H02P 5/06; H02K 29/08
[52] U.S. Cl. ................................... 318/138; 318/254
[58] Field of Search ................... 318/138, 254, 139

[56] References Cited

U.S. PATENT DOCUMENTS

| | | | |
|---|---|---|---|
| 4,015,182 | 3/1977 | Erdman | 318/254 |
| 4,169,990 | 10/1979 | Erdman | 318/254 |
| 4,262,236 | 3/1981 | Gelenius et al. | |
| 4,262,237 | 3/1981 | Gelenius et al. | |
| 4,374,347 | 2/1983 | Muller | 318/254 |
| 4,520,296 | 5/1985 | Lepper et al. | 318/254 |
| 4,870,332 | 9/1989 | Coghran et al. | 318/254 |

OTHER PUBLICATIONS

"Switched Reluctance Motor Drives", by T. J. E. Miller, Oct. 1988, pp. 319 through 327, 338 through 341.
"DC Motors Speed Control Servo Systems Handbook", by Electro-Craft Corporation, 1975, pp. 6-1 to 6-17.
"Motorola Linear and Interface Integrated Circuits", 1988, pp. 4-34 to 4-53.
Motorola Technical Data Sheet for MPT10N10M Power Field Effect Transistor, 1986, pp. 1 through 6.

Primary Examiner—David Smith, Jr.
Attorney, Agent, or Firm—Phillip H. Melamed

[57] ABSTRACT

In a three phase full wave type brushless DC motor control system, the neutral (common) terminal (15) is connected to the positive terminal (14A) of a battery (14) with the negative battery terminal (14B) connected to ground comprising a reference terminal (27) for the control system. Pairs of upper and lower controllable switching drive devices (21A-22A, 23B-24B, 25C-26C) are utilized to control current in windings (13A-13C) of the motor (13). Diodes (29-34) are connected across each of the switching devices for handling inductive transient signals. An effective storage capacitor, preferably comprising individual storage capacitors (36-38) connected across each pair of switching devices, is used to store a boost voltage, above battery voltage, which is generated by inductive transient signals. This configuration not only returns inductive energy in the windings to the battery and/or other windings in the motor, but also substantially reduces radiated noise and conducted noise and therefore provides less battery voltage ripple.

12 Claims, 4 Drawing Sheets

POLYPHASE MOTOR CONTROL SYSTEM

BACKGROUND OF THE INVENTION

The invention relates generally to the field of polyphase motor control systems, and more specifically to the field of such systems in which DC operating potential provides operative power for the polyphase motor.

In prior polyphase, meaning two or more phase, motor control systems which receive DC operative power for a motor from a DC power supply, handling the power transient signals produced by the motor phase windings is generally a problem. Some prior systems, such as the full wave or full bridge motor control systems, utilize pairs of upper and lower switching devices and pairs of upper and lower transient (flyback) diodes to allow the return of the inductive energy stored in the windings to either other windings or the operative DC supply. In such systems, each pair of upper and lower drive devices is directly connected across the DC power supply potential. Such prior systems are able to adequately function when the switching devices receive pulse width modulated pulse excitation which is used to control and/or determine motor rotation speed. However, such control systems result in providing substantial ripple current contamination of the DC power supply and substantial filtering is required to attempt to minimize pulsations in the DC operating potential caused by device switching and commutation transients. Such pulsations in the battery voltage are undesirable if additional loads, besides the polyphase motor, are to be connected across the same voltage, such as would be the case for a polyphase motor receiving operating potential from a battery in an automobile.

Some prior systems have attempted to reduce the number of controllable switching devices used in polyphase motor controls. When this is done, some of these prior systems have developed a boost or storage voltage which may or may not be returned to the DC operating potential depending upon the configuration of these prior systems. The systems which do not return the stored energy to the operating potential or motor windings, are power inefficient and therefore undesirable. Systems which attempt to return the stored inductive energy to the power supply and/or motor, require the use of an additional nondissipative energy storage element, such as an inductor, and typically a chopper control circuit. These components increase the cost of such systems. Also, the use of a chopper control circuit results in generating additional signal transients and that results in undesired radiated noise. In addition, such systems are not operative over a large range of duty cycles for pulse width modulated control signals applied to the switching devices and are difficult to control so as to substantially reduce battery voltage ripple.

In prior polyphase motor control systems, typically all of them result in the phase commutation transients substantially affecting battery current, and therefore battery voltage. In order to minimize the effect of these very lower frequency transients, extensive filtering by large value capacitors and/or inductors is generally utilized, and of course this is undesirable.

SUMMARY OF THE INVENTION

An object of the present invention is to provide an improved polyphase motor control system which overcomes and/or minimizes the previously discussed problems of prior motor control systems.

In one embodiment of the present invention an improved polyphase motor control system is provided. The motor control system comprises: a polyphase DC motor having at least first and second phase windings each having a first and second end, each of the winding first ends connected to a common (neutral) terminal at which a DC power supply voltage potential is provided for providing operative DC power to the motor; and a control circuit connected to the DC motor. The control circuit includes at least first and second controllable switching lower drive devices each associated with one of the windings and each having a control electrode and a pair of main current carrying electrodes with the impedance therebetween being determined by signals at the control electrode. The main current carrying electrodes of each of said first and second lower drive devices are connected between the second ends of the first and second windings, respectively, and a reference terminal connected to a fixed reference potential. The control circuit also includes at least first and second controllable switching upper drive devices each associated with one of the windings and each having a control electrode and a pair of main current carrying electrodes with the impedance therebetween being determined by signals at the control electrode. The main current carrying electrodes of the first and second upper drive devices are connected between the second ends of the first and second windings, respectively, and a boost (stored) voltage terminal.

A boost voltage power supply means, preferably including a capacitive voltage (energy) storage means, is connected between the boost voltage terminal and at least one of the reference and common terminals. A plurality of effective diodes are each connected across an associated pair of main current carrying electrodes of the upper drive devices and poled such that stored energy from said winding associated with said upper drive device can be coupled to the capacitive storage means via the diodes when an open circuit is provided between the main current carrying electrodes of the lower drive device associated with said winding. Preferably additional diodes are also connected across the lower drive devices to handle commutation transients which occur when the upper drive devices are switched off. The capacitive storage means and diodes form part of the boost voltage power supply means which develops a boost voltage, greater than the voltage at the common terminal, via the diodes rectifying phase winding transient signals. Control means are provided for providing signals to the control electrodes of the upper and lower drive devices to selectively provide a short circuit between the upper drive device's main current carrying electrodes to return energy stored by the capacitive storage means to the common terminal via the windings and also to provide stored energy from one of the windings through one of the diodes to another of the windings.

Essentially, the preferred embodiment of the present invention connects one terminal of the operative DC power supply to the neutral (common) terminal of the windings of a control system configuration similar to the prior art full wave or full bridge control system. The opposite polarity terminal of the DC power supply is connected to ground. At least one storage capacitor, which forms the capacitive voltage (energy) storage means, is connected across the pairs of upper and lower devices and this effectively provides a boost voltage power supply circuit since the voltage maintained across this capacitor, one end of which is preferably connected to ground potential, will be above the battery power supply voltage and will vary in accordance with and proportional to the rotational speed of the polyphase motor. This configuration essentially uses the storage capacitor to store inductive energy contained in the phase windings. Then the upper drive devices are used to direct this capacitive stored energy back to the power supply through the windings of the motor. This therefore reutilizes the stored energy to provide additional motor torque without dissipating a substantial amount of the stored inductive energy. In addition, the storage capacitor also is used to provide a source for pulsed ground current supplied by flyback diodes associated with the lower drive devices. This substantially minimizes the amount of power supply voltage ripple and therefore renders the DC power supply substantially more stable than prior full wave or full bridge drive control systems. In addition, it has been found that the present configuration also prevents commutation spikes from substantially affecting the DC power supply voltage while enabling the control system to operate with pulse width modulated control signals having relatively short duty cycles applied to the lower drive devices.

Preferably, the capacitive voltage storage means actually comprises individual storage capacitors each connected across an associated pair of upper and lower drive devices and located physically adjacent thereto. This minimizes the conductor length over which transient power signals must travel and therefore reduces radiated noise signals.

The above discussed advantages of the present invention, as well as other advantages and features, can be better understood by reference to the following more detailed description.

BRIEF DESCRIPTION OF THE DRAWINGS

For a more complete understanding of the invention, reference should be made to the drawings, in which.

DETAILED DESCRIPTION OF THE PREFERRED EMBODIMENT

Figure 1:
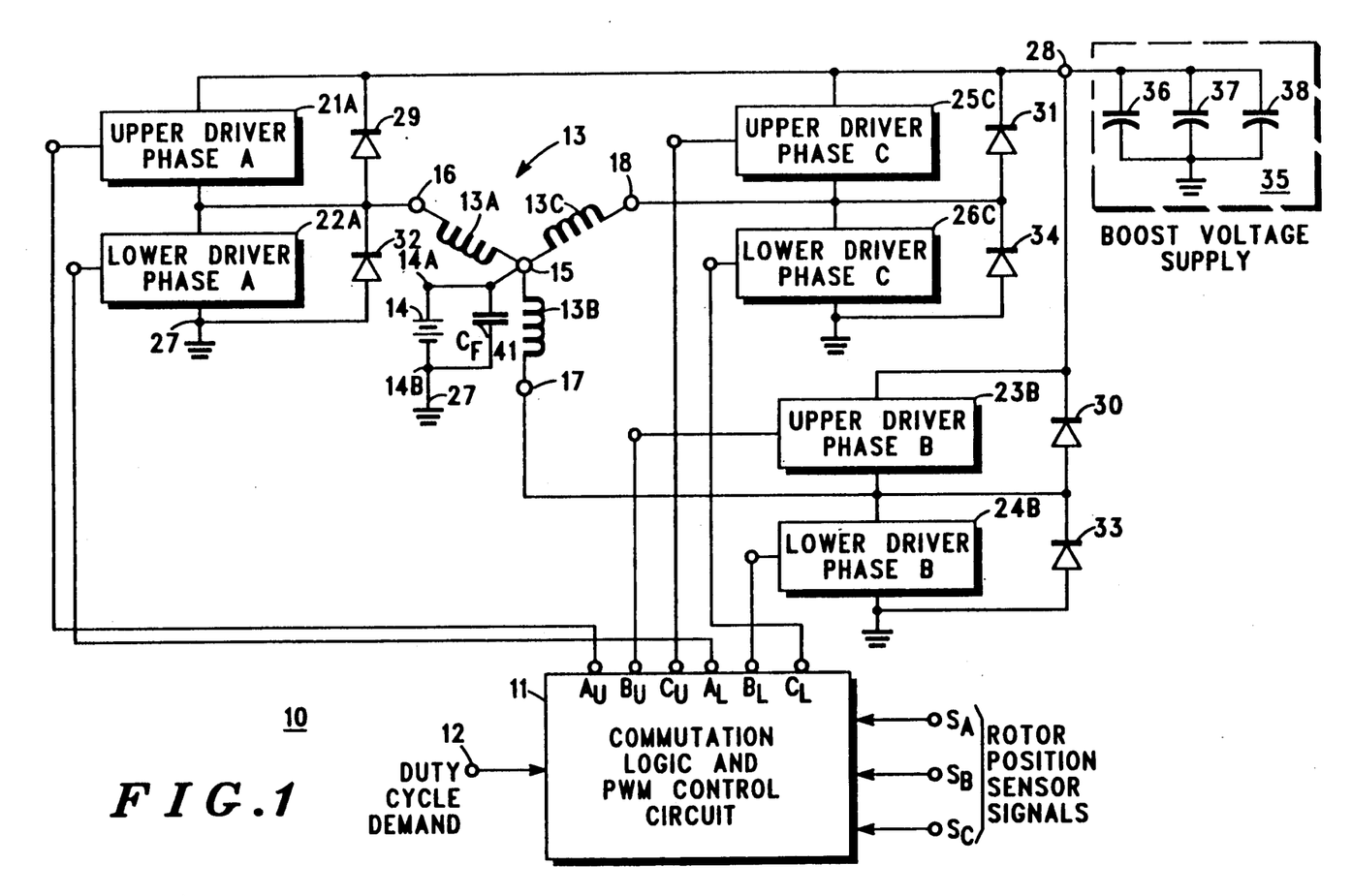
FIG. 1 is a schematic diagram of a polyphase motor control system embodying the present invention.

FIG. 1 illustrates a polyphase (two or more phase) motor control system 10 which corresponds to a three phase motor control system. The system 10 is similar to a full wave or full bridge drive type motor control system, but is configured differently so as to achieve improved performance. The system 10 includes a commutation logic and pulse width modulation (PWM) control circuit 11 which preferably corresponds to a Motorola brushless DC motor controller integrated circuit MC33034. The control circuit 11 receives an analog duty cycle demand signal from a terminal 12 and rotor position sensor signals $S_A$, $S_B$, and $S_C$ which identify the rotational position of a three phase DC brushless motor 13 generally indicated in FIG. 1 by motor phase windings 13A, 13B and 13C.

Figure 3A:
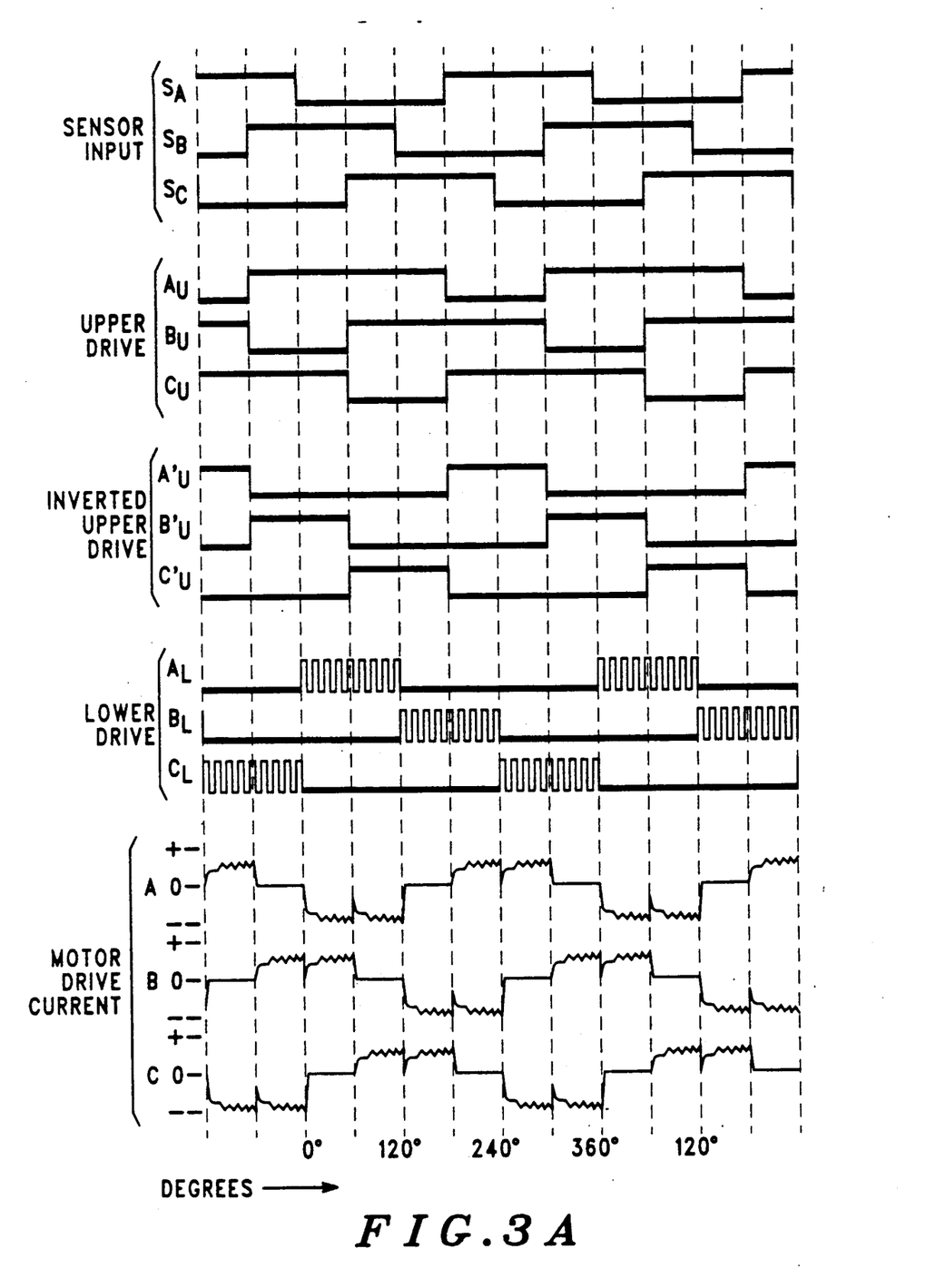
FIGS. 3A and 3B comprise graphs illustrating waveforms for various signals developed in the motor control system shown in FIGS. 1 and 2.

Essentially, in response to the rotor position sensor signals and the duty cycle demand signal at the terminal 12, the control circuit 11 produces 6 control signals at terminals $A_U$, $B_U$, $C_U$, $A_L$, $B_L$, and $C_L$ which are used to control the rotation of the motor 13 by controlling current excitation to the phase windings 13A–13C. The signals provided by the control circuit 11 are substantially identical to those which would be provided by this control circuit if the circuit 11 was utilized to provide control signals to a conventional full bridge drive or full wave drive motor control system. Thus, the control circuit 11 provides pulse width modulated control signals at the terminals $A_L$, $B_L$ and $C_L$ and corresponding pulse signals at the terminals $A_U$, $B_U$ and $C_U$ as shown in FIG. 3A. The providing of such signals is conventional and well understood by those skilled in the art wherein the signal at terminal 12, which determines the duty cycle of the signals at the terminals $A_L$–$C_L$, determines the motor torque which in turn determines motor rotation speed in accordance with the load on the motor 13.

DC operative power for the motor 13 is preferably provided by a power supply battery 14 having its positive electrode terminal 14A directly connected to a neutral (common) terminal 15 of the windings 13A–13C. A negative electrode terminal 14B of the battery 14 is directly connected to ground and a filter capacitor $C_F$ (41) is directly connected across the battery to provide some smoothing of the battery voltage ripple. Each of the windings 13A–13C has a first end directly connected to the neutral terminal 15 at which the battery 14 provides DC operative power to the motor 13. Second ends of the phase windings 13A–13C are designated by terminals 16–18, respectively, in FIG. 1.

Pairs of upper and lower drive controllable switching devices are associated with each of the phase windings 13A–13C and are designated by reference numerals 21–22, 23–24 and 25–26, respectively, wherein each reference numeral is followed by an alphabetic designation indicating which of the phase windings 13A–13C the drive devices are associated with. Each of the upper and lower drive devices shown in FIG. 1 essentially has a control electrode and a pair of main current carrying electrodes with the impedance between the main current carrying electrodes being determined by signals at the control electrode. The control electrodes of devices 21A and 21B are connected to the terminals $A_U$ and $A_L$ of the control circuit 11, respectively. The control electrodes of the devices 23B and 24B, and devices 25C and 26C are similarly connected to output terminals $B_U$, $B_L$ and $C_U$, $C_L$, respectively, of the control circuit 11.

The main current carrying electrodes of each of the lower drive devices are connected between the second end terminals 16–18 of their associated phase windings and a reference terminal 27 at which a fixed reference potential corresponding to ground potential is connected. Thus, the ground terminal 27 corresponds to the battery negative electrode terminal 14B. In addition, the main current carrying electrodes of the upper drive devices 21A, 23B and 25C in FIG. 1 are connected between the second end terminals 16, 17 and 18 of the phase windings associated with these upper drive devices and a boost (or stored) voltage terminal 28. A plurality of effective upper drive device diodes 29–31 are connected between the terminal 28 and each of the terminals 16–18 with the cathodes of each of these diodes connected to the terminal 28. A plurality of effective additional diodes 32-34 are provided with each additional diode associated with one of the lower drive devices and connected between the ground reference terminal 27 and the second end winding terminals 16-18 as shown in FIG. 1. The configuration of the upper and lower drive devices and their associated diodes essentially corresponds to the configuration of a prior full wave drive circuit. However, the connection of the battery 14 to the neutral terminal 15 and the providing of an effective boost voltage power supply circuit 35 connected to the terminal 28 distinguishes the present control system 10, as shown in FIG. 1, from the prior art.

The boost voltage power supply circuit 35 shown in FIG. 1 essentially comprises three parallel capacitors 36, 37 and 38 connected between the terminal 28 and the ground reference potential terminal 27. These three capacitors essentially provide an effective voltage energy storage capacitance which will be used to temporarily store inductive energy from the phase windings 13A-13C and then to return this energy through the phase windings to the battery voltage supply terminal 14A. This return of the stored energy will provide additional torque to the motor 13 while preventing any substantial loss of the inductive energy stored by the motor windings. The basic end result is therefore that the boost voltage supply circuit 35 stores and returns stored inductive phase winding energy to the motor and to the battery 14. This is accomplished in such a matter that the boost voltage power supply circuit 35 provides a power source for phase winding transient signals thus minimizing the effect of these signals on the voltage maintained across the battery 14 and thereby minimizing battery voltage ripple.

In prior full wave motor control systems which did not utilize a boost voltage power supply circuit, the battery was the only power source for phase winding transient signals and therefore was subject to appreciable battery voltage ripple due to inductive transient signals and switching transient signals caused by the switching on and off of the upper and lower drive devices. However, in the control system 10 shown in FIG. 1, the boost voltage power supply circuit minimizes battery voltage ripple and therefore renders the battery voltage more stable. This is of primary concern when the battery 14 corresponds to an automotive vehicle battery that is used to provide power not only to the motor 13 but to additional electrical loads in an automobile.

Figure 2:
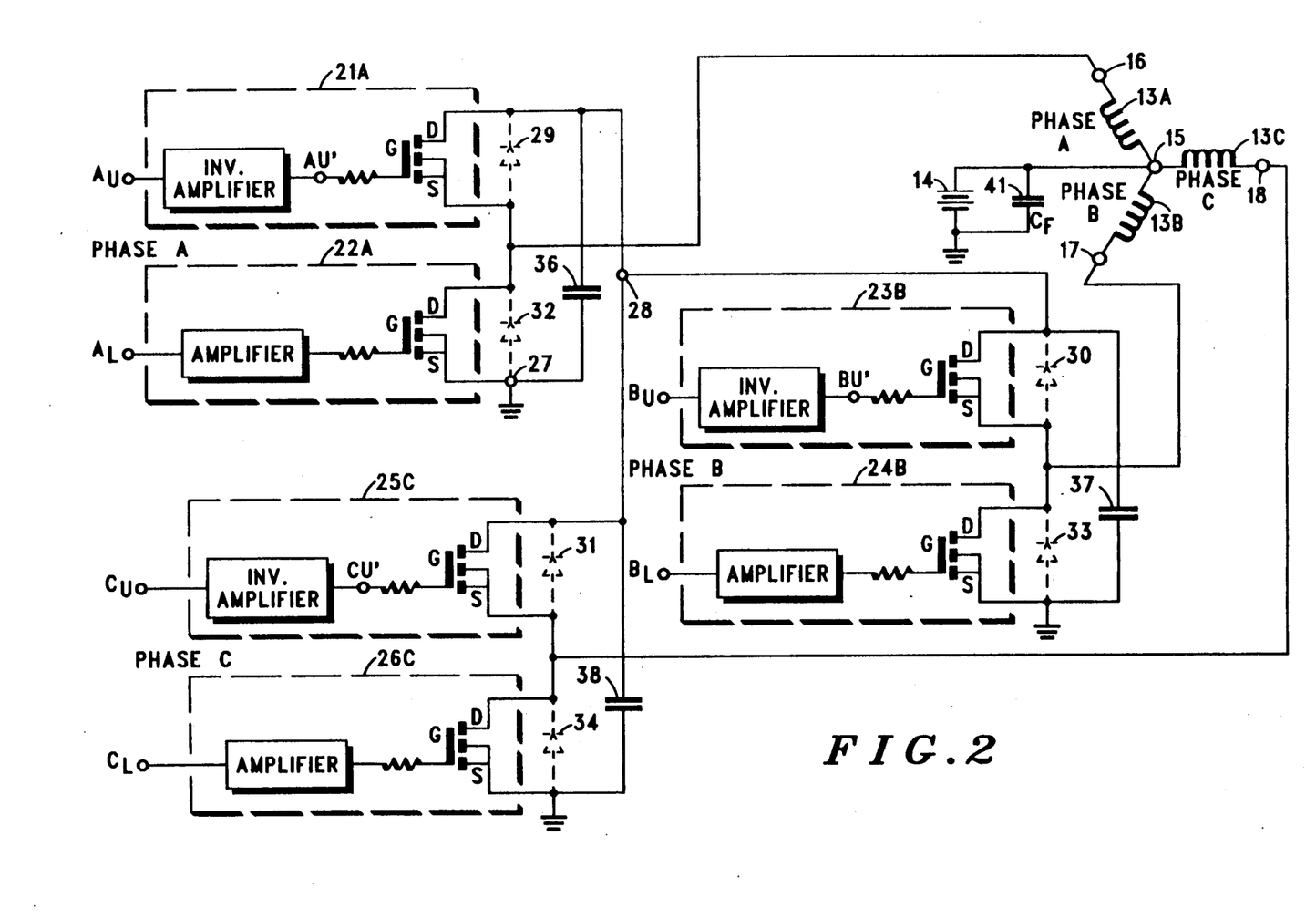
FIG. 2 is a more detailed schematic diagram of a portion of the control system shown in FIG. 1.

FIG. 2 illustrates a preferred configuration for the upper and lower drive devices which are only shown in FIG. 1 in block form. Identical reference numbers are utilized in FIG. 2 to identify identical corresponding components shown in FIG. 1. In FIG. 2, each of the upper drive switching devices 21A, 23B and 25C is shown as essentially comprising an initial inverting amplifier stage whose output, at a terminal A'$_U$, B' or C'$_U$, is resistively coupled to the gate (control) electrode of an FET (field effect transistor) transistor. The main current carrying electrodes of each FET, corresponding to FET drain and source electrodes, are connected between the terminal 28 and the second end terminal of the phase winding associated with the upper drive device. Similarly, the lower drive devices 22A, 24B and 26C in FIG. 2 are shown as comprising a non-inverting amplifier whose output is resistively coupled to the gate (control) electrode of a FET transistor having its drain and source electrodes connected between the second end terminals of the associated phase winding and the ground reference terminal 27. In addition, the diodes 29-31 and 32-34 are illustrated in FIG. 2 in dashed form to indicate that they preferably correspond to the intrinsic diode which is present in each of the FETs shown in FIG. 2. These intrinsic FET diodes have sufficient current carrying capability to enable them to conduct the needed inductive transient currents required by the motor control system 10. Preferably the FETs shown in FIG. 2 comprise International Rectifier Corp. FETs IRFZ44 or IRCZ44. The IRCZ44 FETs are current sensing FETs which preferably may be utilized for the lower drive devices if it is desired to sense or monitor the current passed through these devices.

It should be noted that in FIG. 2, the three parallel boost voltage power supply circuit capacitors 36-38 are illustrated as being each associated with a different one of the pairs of upper and lower drive devices. Preferably, each of the capacitors 36-38 will be positioned physically adjacent to its associated pair of upper and lower drive devices to minimize the distance of the current path between these capacitors and the drive devices. By minimizing this current path, any undesired radio frequency radiation caused by transient signals passing to and/or from these capacitors will be minimized. This therefore minimizes undesired radiation noise generated by the motor control system 10.

The operation of the motor control system 10 will now be described with reference to the signal waveforms shown in FIG. 3A and 3B and the schematic diagrams shown in FIGS. 1 and 2.

In general, when current is desired in a particular phase winding, pulse width modulation pulses are applied to the lower drive device associated with that phase winding. This results in providing alternate short circuit and open circuit connections between the second end terminal of that phase winding and ground. The duty cycle of the modulated signal is determined by the duty cycle demand signal at the terminal 12.

During the providing of an open circuit by one of the lower drive devices between the second end terminal of an associated phase winding and ground, while pulse width modulation pulses are being applied to the lower drive device, the inductive energy previously stored in the phase winding will result in a current to be passed through the diode associated with and connected in parallel to the upper drive device associated with that winding. This current will be passed either to the capacitance comprising the boost voltage power supply circuit 35 or through one of the upper drive devices which is turned on to one of the other phase windings to provide additional motor torque. When a lower drive device subsequently provides a short circuit between the end terminal of its associated phase winding and ground, then the phase winding current is channeled through the lower drive device to ground rather than through the upper drive diode to the boost voltage power supply circuit. However, the boost voltage maintained at the terminal 28, which potential is above the battery potential, is now utilized, through one of the upper drive devices which is turned on, to provide current to another one of the phase windings and to return the stored inductive energy represented by the boost voltage at the terminal 28 to the battery 14 via the motor windings.

The present control system 10 minimizes the amount of battery voltage ripple which would occur if the battery voltage had to absorb or provide all of the current transients caused by repeatedly switching phase winding current directly to the ground reference terminal 27 and then switching it directly to the battery voltage positive electrode which would be the case in prior full bridge circuits. However, in the present control system 10, the boost voltage power supply circuit 35 minimizes battery voltage ripple by effectively absorbing the transient variations since it is available for providing transient currents in addition to the battery 14. The operation of control system 10 is best understood by reference to the waveforms in FIGS. 3A and 3B and is essentially as follows.

Referring to FIG. 3A, waveforms for the sensor input signals $S_A-S_C$ are shown. These signals merely represent rotational position signals used by the control circuit 11 to provide the proper timing for the signals used to control the upper and lower drive devices. In response to these signals, and analog signal at the terminal 12, the control circuit 11 provides appropriate timing for the control signals provided at its output terminals $A_U, B_U, C_U, A_L, B_L$ and $C_L$. These control signals are as shown in FIG. 3A and are designated by the reference notation for the terminals at which they are produced. The providing of these signals is substantially conventional since the circuit 11 comprises an off the shelf integrated circuit previously available and used for providing substantially identical drive signals for a prior full wave or full bridge type motor control system.

Essentially, for the three phase motor 13 shown in FIGS. 1 and 2, the signals at the terminals $A_U-C_U$ comprise pulse signals to sequentially turn on each of the upper drive devices 21A, 23B and 25C in a predetermined sequence for ⅓ of the motor revolution. Signals at the terminals $A'_U, B'_U$ and $C'_U$ are shown to be just the inverse of the signals at the terminals $A_U, B_U$ and $C_U$. The signals provided at the terminals $A_L-C_L$ provide essentially the same type of envelope excitation for the lower drive devices as is provided for the upper drive devices, but now high frequency pulse width modulation pulses are provided. These pulses have a duty cycle determined by the magnitude of the signal at terminal 12 and are utilized for switching the lower drive devices on and off at a rapid rate when current is desired to be passed through the phase winding associated with the lower drive device.

FIG. 3A shows graphs of the motor drive currents A-C produced in each of the corresponding phase windings 13A-13C wherein current directed to the common terminal 15 is indicated as a positive phase winding current and current directed away from terminal 15 is illustrated as a negative phase winding current. A review of the motor drive current waveforms in FIG. 3A indicates that, for example, between 0° and 60° of engine rotation, phase current is passed through the phase winding 13B into the terminal 15 and from the terminal 15 through the phase winding 13A to the terminal 16. During this time, the lower drive device 22A, is receiving pulse width modulation pulses and the upper drive device 23B is maintained in an on condition. This means that during this time the current through the phase winding 13B is provided by the boost voltage power supply 35 providing current through the driver device 23B to the phase winding 13B. The current through the phase winding 13A is passed from common terminal 15 through the lower drive device 22A when this device is on, to ground. When the device is shut off temporary during the providing of the pulse width modulation pulses, the current in the phase winding 13A has to go somewhere. The result is that this current will pass through the diode 29 which rectifies this current signal so as to essentially charge up the boost voltage power supply voltage at terminal 28 to above the positive battery voltage potential at the terminal 15. The magnitude of the boost voltage potential is dependent on and proportional to motor speed and will vary from just one diode drop below battery voltage to approximately twice battery voltage. The fact that the voltage magnitude at the terminal 28 varies in such a manner means that this voltage magnitude can readily and automatically provide a signal indicative of motor speed, and this is often times is very desirable. This is a by product of the present motor control system 10 and eliminates the need of any additional circuitry to provide such a motor speed indicative voltage.

When, during 0° to 60° of motor rotation, the upper drive device diode 29 conducts because of the transient signal caused by the phase winding 13A, this provides a larger than battery voltage boost voltage at the terminal 28, which boost voltage varies in accordance with motor speed. This boost voltage is also provided, via turned on upper drive device 23B as a source for phase winding current for the phase winding 13B. This operation therefore provides for a return of the stored boost voltage at the terminal 28 to the battery 14 via the phase winding 13B. When the lower drive device 22A is turned on during the pulse width modulation cycle then the current passed through the phase winding 13A will be channeled through this device to the ground reference terminal 27 and conduction of the diode 29 ceases. However, at this time the boost voltage terminal 28 continues to supply excitation through the on upper drive device 23B to the phase winding 13B. The waveforms shown in FIG. 3A illustrates that subsequently, during 60°-120° rotation of the motor 13, phase winding 13A will continue to have current passed therethrough, but now phase winding 13C, rather than winding 13B, will pass current to the terminal 15. Subsequently, during motor rotation of 120°-240° and 240°-360° the same process is essentially repeated for the other phase windings. This excitation of two phase windings at a time to produce rotation of a motor is conventional and well understood.

The lower device diodes 32, 33 and 34 are provided so that current from the ground reference terminal 27 will be provided to the second end terminals 16-18 when an upper drive device provides an open circuit after previously providing a short circuit. Previously, this pulsed ground commutation current had to be supplied by just the battery in prior full wave drive circuits. This caused battery voltage ripple. However, now the boost voltage power supply 35 provides some of this pulsed ground current and battery voltage ripple is reduced.

Figure 3B:
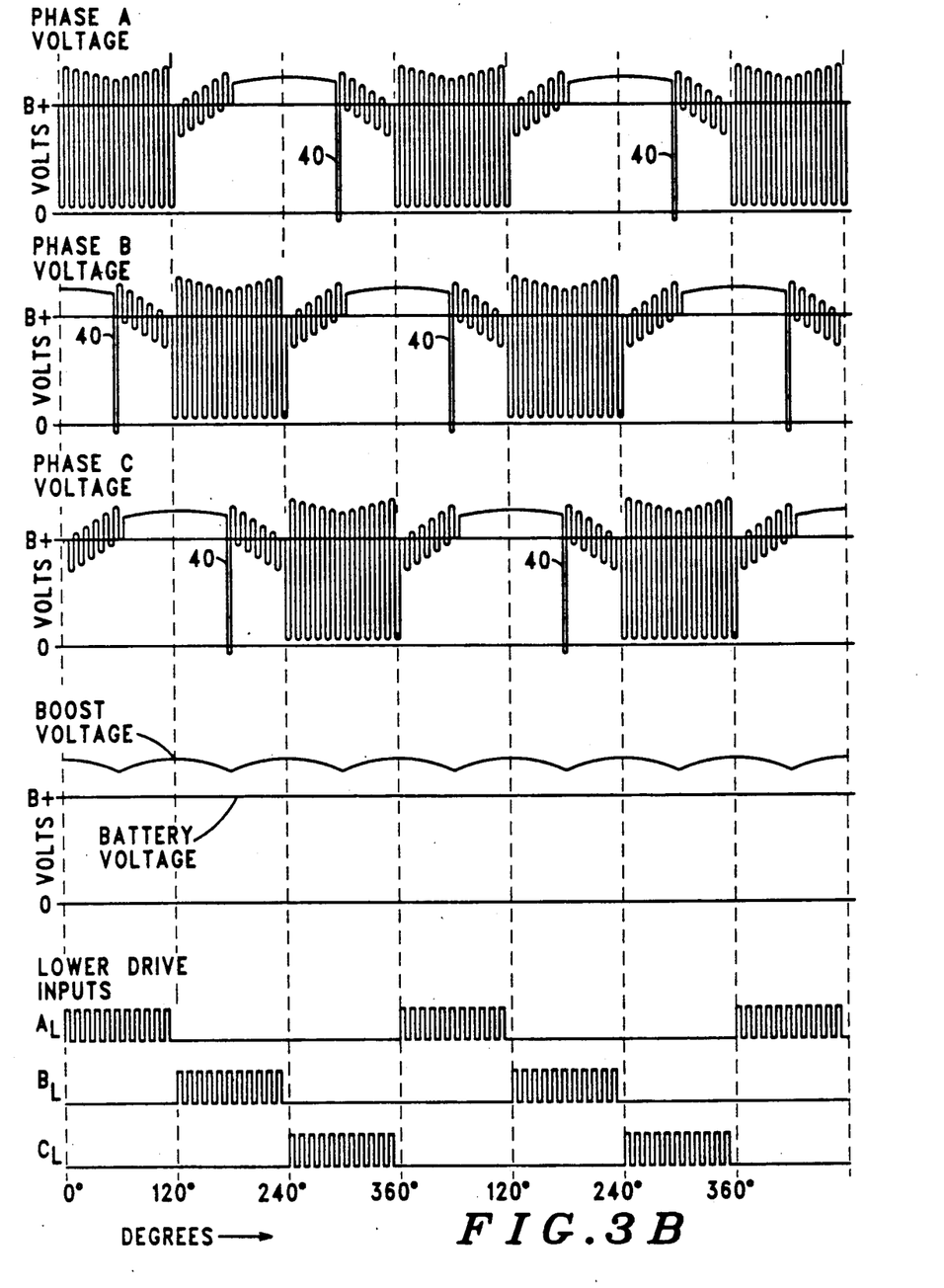

The waveforms in FIG. 3B illustrate the phase voltages A, B and C at the second end terminals 16-18 of the phase windings 13A, B and C. FIG. 3 also shows the magnitude of the boost voltage provided at the terminal 28, for a typical motor speed, with respect to the battery voltage B+ at terminal 14A. The waveforms in FIG. 3A for the control signals for the bottom drive devices 22A, 24B and 26C are repeated in FIG. 3B so as to indicate their correspondence to the other signals shown in FIG. 3B. In both FIGS. 3A and 3B an indication of the rotational position of the motor in degrees is provided to also assist in identifying the correspondence between specific signal states for the various waveforms shown in these Figures.

For the phase voltage signals shown in FIG. 3B it should be noted that commutation transients are indicated therein by very pronounced negative going spikes identified by the reference numeral 40. These signals extend from a positive value equal to the boost voltage at the terminal 28 pulse one diode drop to one diode drop below ground voltage. These are differentiated from the other voltage variations shown in the phase voltage signals which extend, during pulse width modulation of the associated lower phase driver of a phase winding, from the boost voltage maintained at the terminal 28 to an above ground minimal positive voltage equal to the saturation voltage of the lower phase driver associated with that phase winding. What is significant is that the present motor control system 10 essentially eliminates the effect of the commutation transient signals (40) on the battery voltage ripple voltage present at the terminal 15. These commutation transients occur when each of the upper drive devices is switched off to provide an open circuit, after previously providing a short circuit, and one of the lower device diodes must now conduct pulsed ground current. The producing of such commutation transients is conventional in prior full wave drive systems.

Eliminating the effect of commutation spikes in prior motor control systems has caused substantial problems since these spikes occur at a very low and variable frequency. Therefore variations in battery voltage caused by these spikes are hard to remove unless very large filter capacitors and/or inductors are utilized. Also, because the occurrence (frequency) of such spikes is dependent on motor speed, the removal of such spikes from the battery voltage is very difficult because the frequency of these spikes varies. While the present invention does contemplate utilizing a filter capacitor 41 ($C_F$) connected between the positive battery voltage electrode and the ground reference terminal 27, this is just to smooth the battery voltage with regard to the pulse width modulation frequency. Thus, the filter capacitor 41 can have a small value. The effect of the commutation pulses (40) on the battery voltage ripple is minimized by the present control system by the use of the boost power supply and the system's circuit configuration.

In considering the operation of the motor control system 10, it should be noted that the upper drive device effective diodes 29-31 are essentially poled such that stored energy from a phase winding, associated with one of these diodes and upper drive devices, can be coupled through its associated upper device diode to the capacitive storage devices, comprising the capacitors 36-38, when an open circuit is provided between the main current carrying electrodes of the lower drive device associated with this winding. It should also be noted that the control signals provided by the control circuit 11 to the upper and lower drive devices selectively provide short circuits between the upper device's main current carrying electrodes so as to return energy stored by the capacitive storage capacitors 36-38 in the boost voltage power supply circuit 35 to the neutral terminal 15 via the phase windings. These short circuits also provide stored energy from one of the phase windings, passed through one of the upper device associated diodes, to another one of the phase windings. In other words, when one of the upper drive devices is turned on to provide a short circuit between its main current carrying electrodes, this utilizes the boost voltage at terminal 28 to provide current excitation to one of the phase windings. This also allows stored inductive energy from one phase winding to be passed through an associated one of the upper device diodes to the terminal 28 and then through the shorted (turned on) upper drive device to another one of the windings to provide excitation current, as needed, thereto. The energy coupled to the terminal 28 is also used to charge up the capacitive storage elements comprising the boost voltage supply circuit 35.

While I have shown and described specific embodiments of this invention, further modifications and improvements will occur to those skilled in the art. Such modifications could comprise utilizing current sensing FETs, instead of noncurrent sensing FETs, for the switching devices shown in FIG. 2, or using high power bipolar transistors for such devices. In addition, clearly the concepts of the present invention can be expanded to any polyphase motor having two or more phases. All such modifications and improvements which retain the basic underlying principals disclosed and claimed herein are within the scope of this invention.

I claim:
1. A polyphase motor control system, comprising:
    a polyphase DC motor having at least first and second phase windings each having a first and second end, each of the winding first ends connected to a common (neutral) terminal at which a DC power supply voltage potential is provided for providing operative DC power to the motor; and
    a control circuit connected to the DC motor and including,
    at least first and second controllable switching lower drive devices each associated with one of said windings and each having a control electrode and a pair of main current carrying electrodes with the impendance therebetween being determined by signals at said control electrode, the main current carrying electrodes of each of said first and second lower drive devices being connected between said second ends lower of said first and second windings, respectively, and a reference terminal connected to a fixed reference potential,
    at least first and second controllable switching upper drive devices each associated with one of said windings and each having a control electrode and a pair of main current carrying electrodes with the impedance therebetween being determined by signals at said control electrode, the main current carrying electrodes of said first and second upper drive devices being connected between the second ends of said first and second windings, respectively, and a boost (stored) voltage terminal,
    capacitive voltage storage means connected between said boost voltage terminal and at least one of said reference and common terminals,
    a plurality of effective diode means, each connected across an associated pair of main current carrying electrodes of said upper drive devices and poled such that stored energy from said winding associated with said upper drive device can be coupled to said capacitive storage means via said diode means when an open circuit is provided between the main current carrying electrodes of said lower drive device associated with said winding, and
    control means for providing signals to the control electrodes of said upper and lower drive devices to selectively provide a short circuit between said upper drive device's main current carrying electrodes to return energy stored by said capacitive storage means to said common terminal via said windings and also to provide stored energy from one of said windings through one of said diode means to another of said windings, wherein said capacitive storage means comprises a plurality of separate capacitors each associated with one pair of upper and lower drive devices associated with one of said windings, and wherein each of said separate capacitors is positioned physically adjacent to the pair of upper and lower drive devices which it is associated with.

2. A polyphase motor control system according to claim 1 which includes a plurality of additional effective diode means each connected across an associated pair of main current carrying electrodes of said lower drive devices and poled such that current between said reference terminal and one of said winding second ends will be provided via said additional effective diode means when an open circuit is provided, after a short circuit, between the main current carrying electrodes of said upper drive device associated with the same winding associated with the additional diode means and its associated lower drive device.

3. A polyphase motor control system according to claim 2 which includes a battery having one voltage polarity terminal connected to said neutral terminal.

4. A polyphase motor control system according to claim 3 wherein another voltage polarity terminal of said battery is connected to said reference terminal which is also connected to ground potential.

5. A polyphase motor control system according to claim 4 wherein said capacitive voltage storage means is connected between said boost voltage terminal and said reference terminal.

6. A polyphase motor control system according to claim 5 which includes a filter capacitor connected between said neutral and reference terminals.

7. A polyphase motor control system according to claim 2 wherein each of said upper and lower drive devices comprises an FET, and wherein each of said diode means and additional diode means comprises an intrinsic diode in each of said FETs.

8. A polyphase motor control system according to claim 2 wherein said polyphase motor includes at least a third phase winding connected similarly to said first and second phase windings, and wherein said control circuit includes a pair of upper and lower drive devices and associated diode and additional diode means associated with said third phase winding and connected similarly to the drive devices and diode means associated with said first and second phase windings, and wherein said capacitive storage means includes an additional separate capacitor associated with said third phase winding and positioned physically adjacent to the pair of upper and lower drive devices associated with said third phase winding.

9. A polyphase motor control system according to claim 2 wherein said control means provide said control signals such that the magnitude of the voltage provided at said boost voltage terminal is proportional to the rotation speed of the polyphase motor.

10. A polyphase motor control circuit according to claim 2 wherein said control means provides pulse width modulation pulse signals as said control signals.

11. A polyphase motor control system, comprising:

a polyphase DC motor having at least first and second phase windings each having a first and second end, each of the winding first ends connected to a common (neutral) terminal at which a DC power supply voltage potential is provided for providing operative DC power to the motor; and a control circuit connected to the DC motor and including, at least first and second controllable switching lower drive devices each associated with one of said windings and each having a control electrode and a pair of main current carrying electrodes with the impedance therebetween being determined by signals at said control electrode, the main current carrying electrodes of each of said first and second lower drive devices being connected between said second ends of said first and second windings, respectively, and a reference terminal connected to a fixed reference potential, at least first and second controllable switching upper drive devices each associated with one of said windings and each having a control electrode and a pair of main current carrying electrodes with the impedance therebetween being determined by signals at said control electrode, the main current carrying electrodes of said first and second upper drive devices being connected between the second ends of said first and second windings, respectively, and a boost (stored) voltage terminal, boost voltage power supply means connected to said windings and including rectifier means for rectifying transient signals produced by said windings and developing a boost voltage potential, at said boost voltage terminal, greater than the voltage potential at said common terminal, and control means for providing signals to the control electrodes of said upper and lower drive devices to selectively provide a short circuit between said upper drive device's main current carrying electrodes to create said transient signals and also to couple said boost voltage potential to said common terminal via said windings to thereby provide additional motor torque, wherein said boost voltage power supply means comprises a plurality of separate capacitors each associated with one pair of upper and lower drive devices associated with one of said windings and each connected between said boost voltage terminal and at least one of said reference and common terminals, and wherein each of said separate capacitors is positioned physically adjacent to the pair of upper and lower drive devices which it is associated with.

12. A polyphase motor control system according to claim 11 wherein said polyphase motor includes at least a third phase winding connected similarly to said first and second phase windings, and wherein said control circuit includes a pair of upper and lower drive devices associated with said third phase winding and connected similarly to the drive devices associated with said first and second phase windings, and wherein said boost voltage means includes an additional separate capacitor associated with said third phase winding and connected between said boost voltage terminal and at least one of said reference and common terminals, and wherein said capacitor associated with said third phase winding is positioned physically adjacent the pair of upper and lower drive devices associated with said third phase winding.

* * * * *